(12) United States Patent
Chuah et al.

(10) Patent No.: US 6,993,021 B1
(45) Date of Patent: Jan. 31, 2006

(54) LIGHTWEIGHT INTERNET PROTOCOL ENCAPSULATION (LIPE) SCHEME FOR MULTIMEDIA TRAFFIC TRANSPORT

(75) Inventors: Mooi Choo Chuah, Eatontown, NJ (US); Wolfgang Fleischer, Swindon (GB); Anlu Yan, Eatontown, NJ (US); On-Ching Yue, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/264,053

(22) Filed: Mar. 8, 1999

(51) Int. Cl.
*H04L 12/56* (2006.01)
(52) U.S. Cl. .................. 370/389; 370/466; 370/469
(58) Field of Classification Search .............. 370/466, 370/467, 468, 469, 472, 473, 474, 476, 392–394
See application file for complete search history.

(56) References Cited

U.S. PATENT DOCUMENTS

| | | | | |
|---|---|---|---|---|
| 4,435,173 A | | 3/1984 | Siposs et al. ............... 604/155 |
| 4,457,751 A | | 7/1984 | Rodler ......................... 604/66 |
| 5,065,398 A | * | 11/1991 | Takashima .................. 370/230 |
| 5,594,732 A | * | 1/1997 | Bell et al. ................... 370/401 |
| 5,713,856 A | | 2/1998 | Eggers et al. ................ 604/65 |
| 5,717,690 A | * | 2/1998 | Peirce et al. ................ 370/389 |
| 5,734,653 A | * | 3/1998 | Hiraiwa et al. ............. 370/395 |
| 5,931,961 A | * | 8/1999 | Ranganathan et al. ...... 714/712 |
| 6,041,054 A | * | 3/2000 | Westberg .................... 370/389 |
| 6,044,081 A | * | 3/2000 | Bell et al. ................... 370/401 |
| 6,052,819 A | * | 4/2000 | Barker et al. ............... 714/776 |
| 6,075,787 A | * | 6/2000 | Bobeck et al. .............. 370/395 |
| 6,081,524 A | * | 6/2000 | Chase et al. ................ 370/389 |
| 6,107,911 A | | 8/2000 | Perrone ................. 340/309.16 |
| 6,115,422 A | * | 9/2000 | Anderson et al. ............ 375/240 |
| 6,122,670 A | * | 9/2000 | Bennett et al. .............. 709/236 |
| 6,157,719 A | * | 12/2000 | Wasilewski et al. .......... 380/21 |
| 6,160,793 A | * | 12/2000 | Ghani et al. ................ 370/236 |
| 6,175,573 B1 | * | 1/2001 | Togo et al. .................. 370/474 |
| 6,205,148 B1 | * | 3/2001 | Takahashi et al. .......... 370/401 |
| 6,212,190 B1 | * | 4/2001 | Mulligan .................... 370/400 |
| 6,229,821 B1 | * | 5/2001 | Bharucha et al. ........... 370/471 |
| 6,229,823 B1 | * | 5/2001 | Scarmalis ................... 370/477 |
| 6,286,052 B1 | * | 9/2001 | McCloghrie et al. ....... 709/238 |
| 6,292,495 B1 | * | 9/2001 | Von Hammerstein et al. ........................... 370/465 |
| 6,295,296 B1 | * | 9/2001 | Tappan ....................... 370/392 |
| 6,330,242 B1 | * | 12/2001 | Ogawa et al. ......... 370/395.52 |
| 6,341,129 B1 | * | 1/2002 | Schroeder et al. .......... 370/354 |
| 6,366,961 B1 | * | 4/2002 | Subbiah et al. ............. 709/238 |
| 6,554,798 B1 | | 4/2003 | Mann et al. ................. 604/131 |

(Continued)

FOREIGN PATENT DOCUMENTS

CA 2220252 9/1997

OTHER PUBLICATIONS

J. Rosenberg, "An RTP Payload Format for user Multiplexing", work in progress, draft-ietf-avt-aggregation-00.txt.

(Continued)

*Primary Examiner*—Chi Pham
*Assistant Examiner*—Thai Hoang

(57) ABSTRACT

A packet encapsulation scheme for multiplexing application sessions—Lightweight IP Encapsulation (LIPE)—is described. An LIPE packet comprises at least one multiplexing header (NH) and associated multimedia data packet (MDP). The LIPE packet uses UDP/IP as transport. An MH field further comprises a 16-bit a user identifier (UID) field, an 11 bit length indicator (LNG) field, a 1 bit "more" (M) field and an optional payload type/class of service (PT/CoS) field comprising 8 bits.

19 Claims, 8 Drawing Sheets

| UID | LNG | M | SEQ | O | PT/CoS |
|---|---|---|---|---|---|
| (16) | (11) | (1) | (3) | (1) | (8) |

Multiplexing Header (MH)

U.S. PATENT DOCUMENTS

| | | |
|---|---|---|
| 6,650,951 B1 | 11/2003 | Jones et al. .................... 604/65 |
| 2002/0046073 A1 | 4/2002 | Indseth et al. ................. 705/8 |
| 2002/0193679 A1 | 12/2002 | Malave et al. .............. 600/407 |
| 2003/0114836 A1 | 6/2003 | Estes et al. .............. 604/890.1 |

OTHER PUBLICATIONS

B. Subbiah and S. Sengodan, "User Multiplexing in RTP Payload between IP Telephony Gateway", work in progress, draft-ietf-avt=mux-rtp-00.txt, Aug. 1998.

U.S. Patent Application of Doshi et al., entitled Simple Data Link (SDL) Protocol, U.S. Appl. No. 09/039,112, filed Mar. 13, 1998.

U.S. Patent application of Lyons et al., entitled "An Extended Header for Use in ATM Adaptation Layer Type 2 Packets", U.S. Appl. No. 08/880,181, filed on Jun. 20, 1997.

Rosenberg, J. et al. "An RTP Payload Format for User Multiplexing." IETF Internet Draft; May 6, 1998 (XP-00212739).

Subbiah, B. et al. "User Multiplexing in RTP payload between IP Telephony Gateways." IETF Internet Draft; Aug. 21, 1998 (XP-002127741).

Cameron, P. et al. "Transport Multiplexing Protocoal (TMux)." IETF Network Working Group; Aug. 1994 (XP-002225116).

S. Floyd, V. Jacobson, C-G. Liu, S. McCanne, and L. Zhang "A reliable multicast framework for light-weight sessions and application level framing", Networking, IEEE/ACM Transactions on, vol. 5, Issue 6, Dec. 1997, pp. 784-803.

A. Eriksson, C. Gehrmann, "Robust and secure light-weight resource reservation for unicast IP traffic", Quality od Service, 1998, Sixth International Workshop on, 1998, pp. 168-170.

Schulzrinne et al., "RTP: A Transport protocol for Real-Time Applications", IETF Request for Comments 1889, Jan. 1996, XP-002229836, pp. 1-38.

* cited by examiner

LIGHTWEIGHT INTERNET PROTOCOL ENCAPSULATION (LIPE) SCHEME FOR MULTIMEDIA TRAFFIC TRANSPORT

FIELD OF THE INVENTION

This invention relates generally to communications and, more particularly, to packet communications systems.

BACKGROUND OF THE INVENTION

As wireless systems continue to evolve, communications between a mobile switching center (MSC) and its bases stations are moving to an Internet Protocol (IP) based transport mechanism. (As used herein, the term wireless systems refers to e.g., CDMA (code division multiple access), GSM (Global System for Mobile Communications), the proposed UMTS (Universal Mobile Telecommunications System), etc.) Given the nature of wireless communications, e.g., real-time voice, any IP-based transport needs to utilize a protocol that accommodates real-time applications.

One such protocol is the Real Time Protocol (RTP) (e.g., see H. Schulzrinne, R. Frederick, V. Jacobson, "RTP: A Transport Protocol for Real-Time Applications," RFC 1889). RTP is attractive since it is an available Internet Engineering Task Force (IETF) protocol for handling real-time streams. RTP traffic is encapsulated in UDP (user datagram protocol), and IP packets.

However, while RTP is designed to support real time applications, RTP makes no assumption on the ability of the underlying network to provide timely delivery or quality-of-service (QoS) guarantees. As such, RTP performs best when the underlying network is not heavily loaded and the applications using RTP can adapt to the underlying network conditions to some extent.

In addition, the very size of the packet payload in wireless applications also presents a problem when using RTP. For example, packets that transport voice are, in general, rather small compared to packets that transport mere data. ITU-T G723.1 specifies generation of a 20 byte speech packet at 30 ms intervals (e.g., see ITU-T Recommendation G.723.1 "Dual Rate Speech Coder for Multimedia Communications Transmitting At 5.3 and 6.3 Kbps," 1995). Consequently, packets used to transport voice are subjected to a large overhead. For example a 10-byte voice packet transmitted using a User Datagram Protocol/Internet Protocol (UDP/IP) encapsulation incurs an overhead of 28 bytes (20 byte IP header, plus up to 8 bytes of UDP header), or 280%. In addition, if each application session (also referred to herein as an audio stream, or packet flow), requires use of one UDP session, the resulting large number of packets may create heavy packet processing load for any intermediate routers.

Fortunately, to improve transport efficiency, some multiplexing schemes have been proposed within the framework of RTP (e.g., see J. Rosenberg, "An RTP Payload Format for User Multiplexing," work in progress, draft-ietf-avt-aggregation-00.txt; and B. Subbiah, S. Sengodan, "User Multiplexing in RTP payload between IP Telephony Gateway," work in progress, draft-ietf-avt=mux-rtp-00.txt, August, 1998). An illustrative portion of a protocol stack, 30, using an RTP-based multiplexing scheme is shown in FIG. 1. Traffic is first multiplexed via the RTP Mux layer. RTP traffic is then encapsulated in UDP and IP packets. (It should be noted that other layers (not shown) also exist above and below. For example, below the IP layer sits the media access control (MAC) layer, which is on top of the physical layer, as known in the art.) However, none of these approaches address QoS.

SUMMARY OF THE INVENTION

We have observed that many of the features of RTP are designed to cope with the unavailability of QoS guarantees from the underlying network. As such guarantees become available in developing IP networks, some of these RTP features become unnecessary. As such, we propose an alternative packet encapsulation scheme for multiplexing application sessions—Lightweight IP Encapsulation (LIPE).

In an embodiment, an LIPE packet comprises at least one multiplexing header (MH) and associated multimedia data packet (MDP). The LIPE packet uses UDP/IP as transport. The MH field further comprises a 16-bit a user identifier (UID) field, an 11 bit length indicator (LNG) field, a 1 bit "more" (M) field; and an optional payload type/class of service (PT/CoS) field comprising 8 bits. The UID field allows up to 65536 applications to be multiplexed into a single UDP/IP session. The LNG field allows a maximum MDP size of 2048 bytes. Incoming data packets can be partitioned into multiple MDPs by the use of the M field. The optional PT/CoS field is further partitioned into a 3 bit PT field (not shown) and a 5 bit CoS field (not shown). The PT field is used to identify the payload type. The five bit CoS field is available to identify the desired class of service (or QoS) of the MDP.

DETAILED DESCRIPTION

Figure 1:
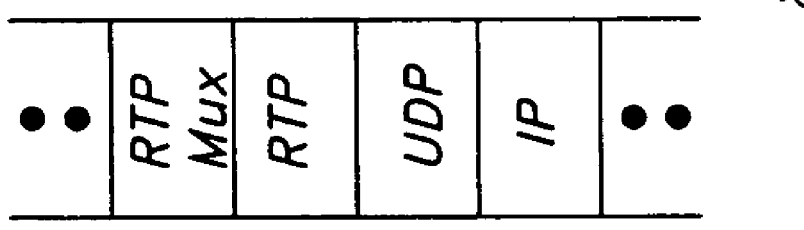
FIG. 1 shows a portion of a prior art protocol stack.
Figure 2:
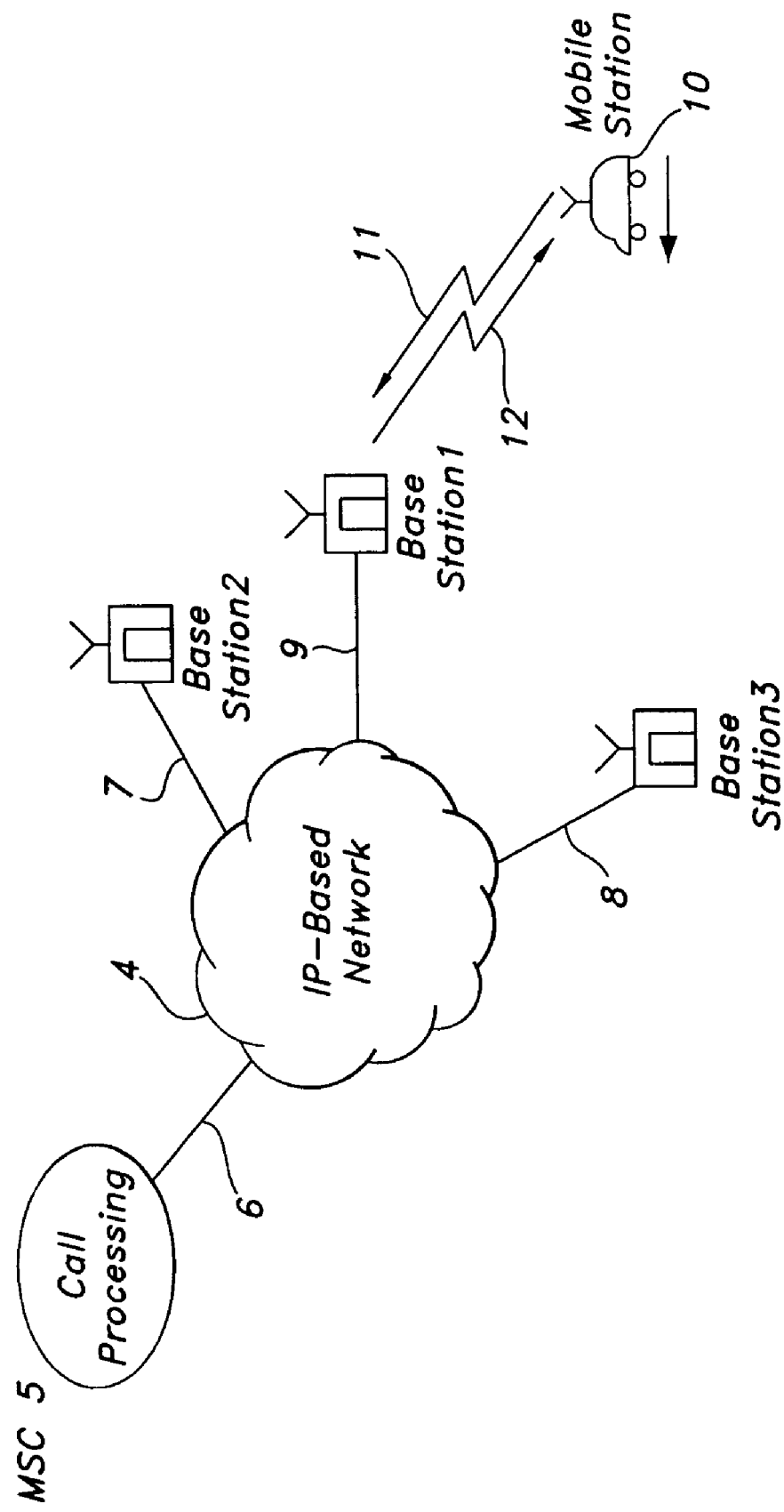
FIG. 2 shows a portion of a mobile communications system embodying the principles of the invention.

A portion of a CDMA-based mobile communications system 20 embodying the principles of the invention is shown in FIG. 2. Other than the inventive concept, the elements shown in FIG. 2 are well-known and will not be described in detail. For example, although shown as a single block element, base station 1 includes stored-program-control processors, memory, and appropriate interface cards. Except as noted below, it is assumed that the CDMA mobile communications system conforms to industry standard IS-95. Portion 20 comprises mobile switching center (MSC) 5, which (among other things) provides call processing; three base stations: 1, 2, and 3; a mobile station 10, which is illustratively represented by a vehicle icon, and IP-based network 4. Mobile station 10 is in communications with any of the base stations, via downlink signal 12 and uplink signal 11. The three base stations and the mobile station are representative of wireless endpoints. Each base station is coupled to MSC 5 via IP-based network 4. The latter is representative of any Internet-Protocol (IP) based network infrastructure and includes other components (not shown) such as routers, etc., for communicating IP packets between packet endpoints, which are represented by MSC 5, and base stations 1, 2, and 3. Likewise, the solid lines between the packet endpoints and IP-based network 4 are representative of well-known communications facilities, e.g., the connection between MSC 5 and IP-based network 4, illustrated by line 6, is supported by asynchronous transfer mode (ATM) over a synchronous optical network (SONET), etc. It is assumed that IP-based network 4 provides certain resource guarantees with respect to bandwidth, delay and loss guarantees (not shown).

In the interests of simplicity, LIPE is described in the context of communications from base station 1 to MSC 5, i.e., from one packet endpoint to another packet endpoint. However, and as is readily observed, LIPE is applicable to any packet endpoint and is not confined to a mobile communications system.

Figure 3:
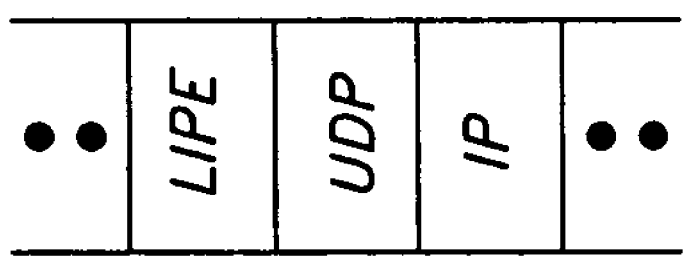
FIG. 3 shows a portion of a protocol stack in accordance with the principles of the invention.
Figure 4:
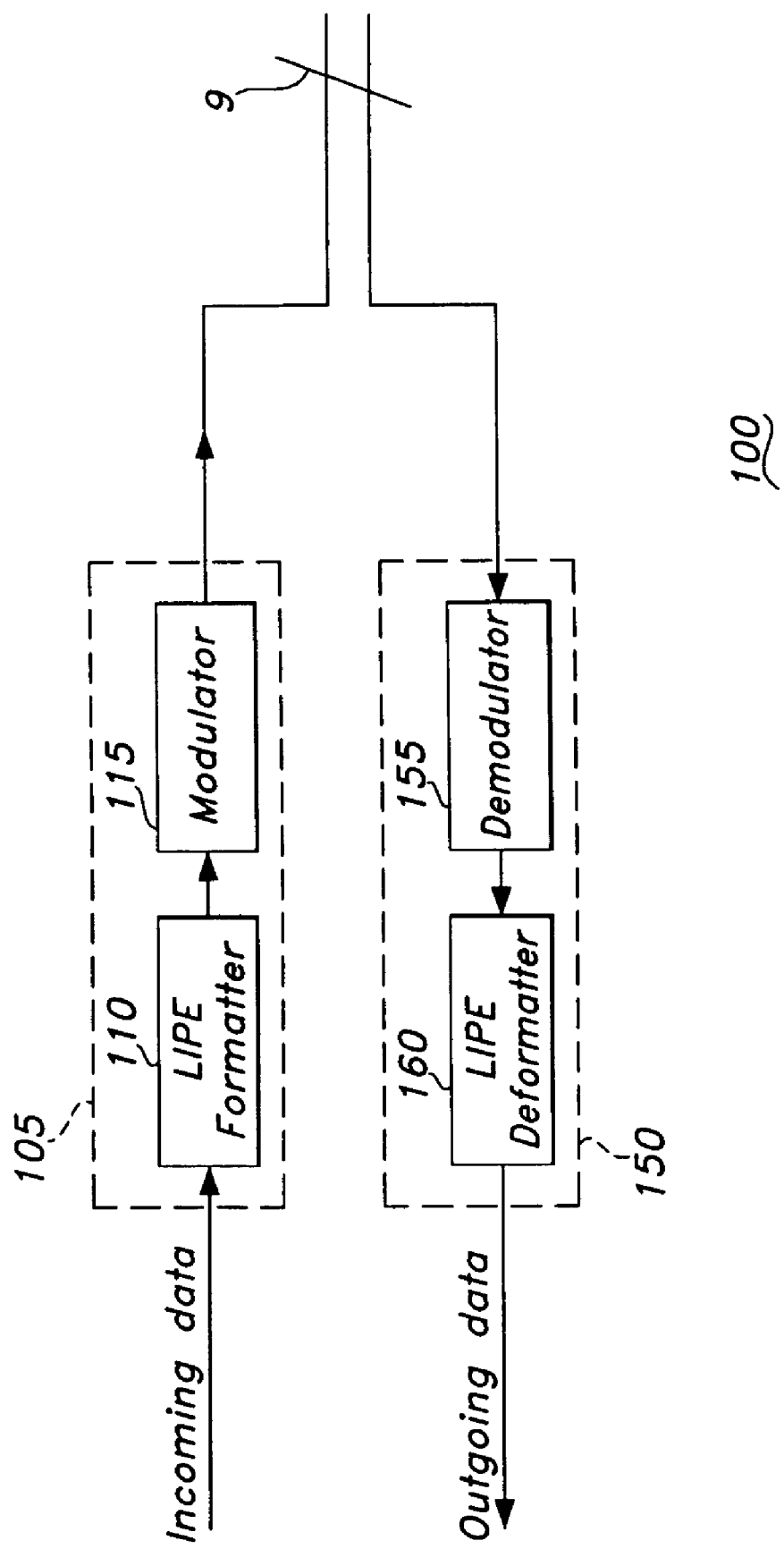
FIG. 4 shows a portion of a packet endpoint in accordance with the principles of the invention.

Base station 1 receives voice traffic from mobile stations (represented by the single icon of mobile station 10). In accordance with the inventive concept, base station 1 multiplexes this voice traffic from the various sources into LIPE packets, which are further encapsulated into UDP/IP packets. An illustrative portion of a protocol stack, 50, using LIPE is shown in FIG. 3. Turning now to FIG. 4, this figure shows a portion, 100, of a packet endpoint embodying the principles of the invention for use in, e.g., base station 1. Other than the inventive concept, the elements shown in FIG. 4 are well-known and will not be described in detail. For example, controller LIPE formatter 110 is representative of a stored-program-controlled processor with associated memory as known in the art. Also, only that portion of a packet endpoint related to the inventive concept is shown, e.g., other processing, control signaling, or formatting of data is not described. Portion 100 comprises LIPE transmitter 105 and LIPE receiver 150. The former element comprises LIPE formatter 110 and modulator 115. LIPE Formatter 110 receives an incoming data stream of packets (in the context of base station 1, representing voice traffic from wireless endpoints such as mobile station 10) and formats the data stream into LIPE packets (described below) to provide a stream of encapsulated LIPE packets to modulator 115. The latter element forms a signal for transmission to an opposite packet endpoint, e.g., MSC 5 via IP-based network 4. In complementary fashion to LIPE transmitter 105, LIPE Receiver 150 comprises demodulator 155 and LIPE deformatter 160. Demodulator 155 demodulates the received signal and provides a stream of packetized encapsulated data to LIPE deformatter 160. The latter performs packet recovery to form an outgoing data stream.

Figure 5:
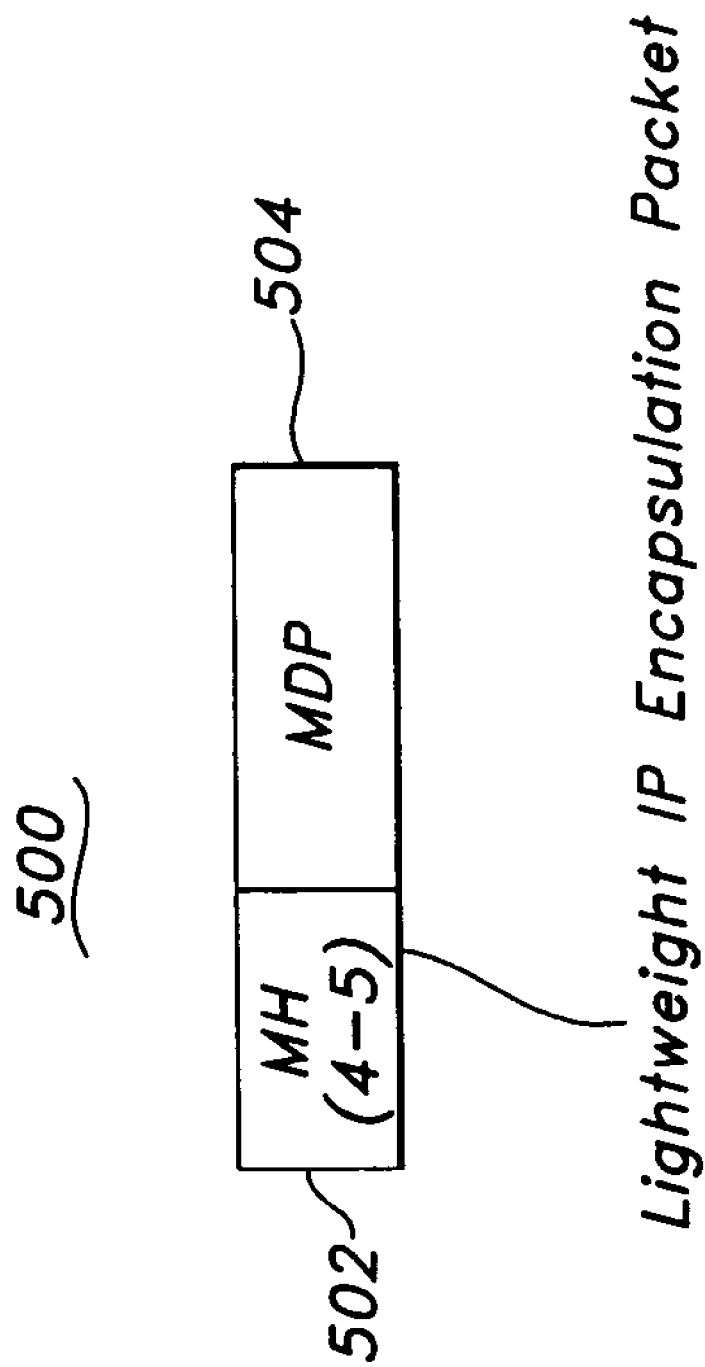
FIG. 5 shows an illustrative LIPE packet format in accordance with the principles of the invention.
Figure 6:
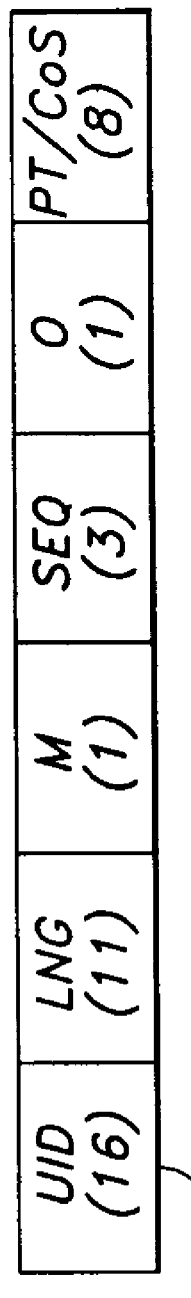
FIG. 6 shows an illustrative format for a multiplexing header according to the present invention.

Turning now to FIG. 5, an illustrative format of an LIPE packet is shown. Lightweight IP Encapsulation (LIPE) is designed to support multimedia traffic (e.g., voice, video, data). The LIPE formatter 110 analyzes the multiplexing header information associated with each incoming data packet and formats each incoming data packet into an LIPE data packet 500 that comprises at least one multiplexing header (MH) 502 for each multimedia data packet (MDP) 504. The data from each incoming data packet can be concatenated into several multimedia data packets by utilizing a signal "more" (M) bit that can be added to a data packet header to operate in a manner that is well known in the art. Therefore, each multimedia data packet 504 from an incoming data packet will be formatted with an LIPE multiplexing header 502 that is optimized to provide multiplexing information and the Real Time Protocol (RTP) features necessary for modern UDP/IP transport networks that feature various levels of Quality of Service (QoS) guarantees. When the LIPE formatter 110 receives each MDP 504, it adds the MH 502 of the present invention. The MH 502 is ideally 4 to 5 bytes in length and contains the fields illustrated in FIG. 6.

a user identifier (UID) field comprising 16 bits;
a length indicator (LNG) field comprising 11 bits;
a "more" (M) field comprising 1 bit;
a sequence number (SEQ) field comprising 3 bits;
an optional header indicator (O) field comprising 1 bit; and
an optional payload type/class of service (PT/CoS) field comprising 8 bits.

As noted, the UID field is 16 bits long. This allows up to 65536 applications to be multiplexed into a single UDP/IP session. This seemingly high number is chosen for the following reasons. First, in applications involving a mobile environment (such as illustrated in FIG. 2), when a mobile station is handed off from one base station to another, the application on this mobile station will have to be multiplexed into another UDP session in the new base station. Assuming each mobile station takes up one identifier and that the UID space is large enough, it is then possible to make the UID unique to the frame handler in the mobile switching center. Consequently during soft handoff between base stations controlled by the same frame handler, there is no need to reassign the UID thus saving signaling cost. Second, in other communications environments, many applications may be alive but not active for some time, and these "dormant" applications still hold the associated application identifiers. Therefore, the number of active applications that actually contribute to the multiplexing gain may be much smaller.

The LNG field of 11 bits allows a maximum MDP size of 2048 bytes. This should be sufficient for most data applications. If an incoming data packet is larger than 2048 bytes, it is carried by multiple MDPs in the same UDP packet. In this case, the above-mentioned M field is used to indicate that there is data in each of the following MDPs. In particular, each of the corresponding MHs—except the last one—set its M bit to 1.

The 3 bit sequence number can be used by the receiver to unambiguously identify the packets within a certain time window when there is loss, out-of-sequence delivery or delay jitter. (As known in the art, a range of sequence numbers is typically finite and repeats. For example, there may be eight sequence numbers, 0–7. At the start of a transmission, the first transmitted packet includes the sequence number 0. After the first eight packets are transmitted the sequence numbers begin to repeat, starting again at 0.) With the help of the sequence numbers, the receiver is able to buffer the packets for smoother playback. The sequence number can be made short because it is assumed that the underlying network provides certain resource guarantees so the delay jitter is small.

The 1-bit O field is used to indicate whether the optional part of the header, the PT/CoS field is present.

The optional PT/CoS field is further partitioned into a 3 bit PT field (not shown) and a 5 bit CoS field (not shown). The PT field is used to identify the payload type. For example, different voice sources may use different codecs to encode voice packets and, in this context, the PT field identifies the codec type. (Although there may be more than 8 encoding schemes available in different standards, these 3 bits accommodate the 8 most commonly used encoding schemes in ITU standards (e.g., see Cox, "*Three New Speech*

Coders from the ITU Cover a Range of Applications," IEEE Communications Magazine, September 1997 Vol 35, No 9, pp 40–47).) The five bit CoS field is available to identify the desired class of service of the MDP.

Figure 7:
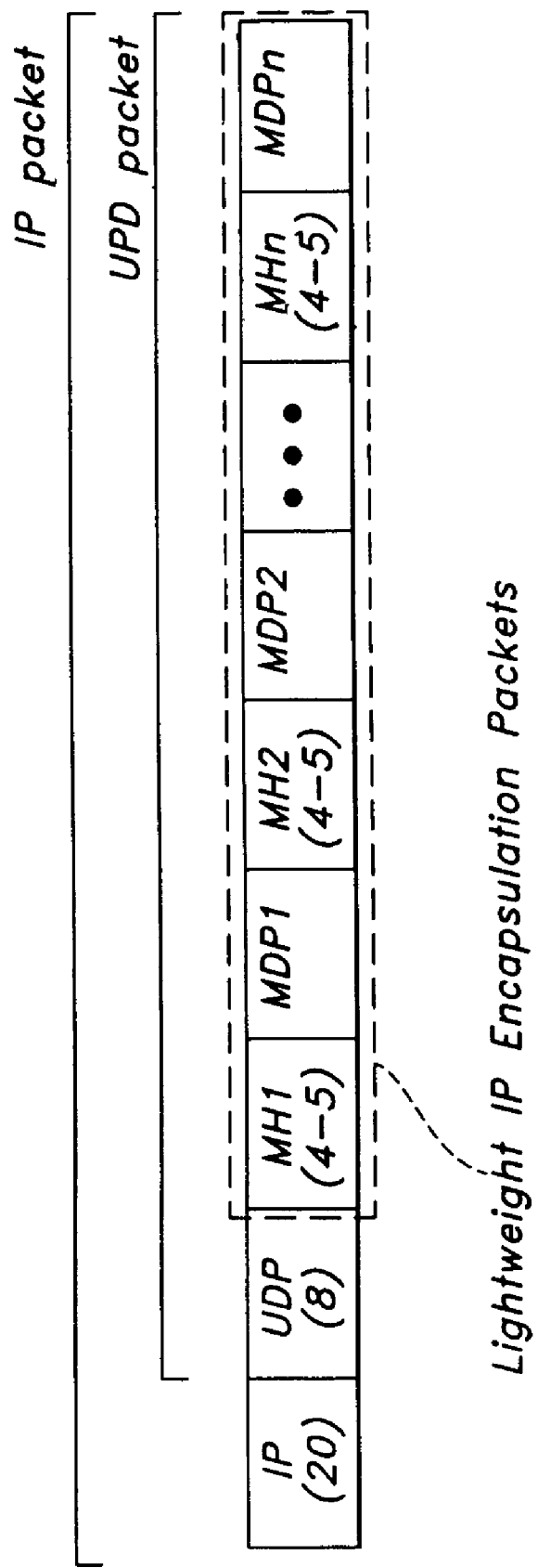
FIG. 7 shows LIPE encapsulation.

As shown in FIG. 7, LIPE uses UDP/IP as transport as known in the art. Encapsulated LIPE packets are preceded by a 20 byte IP header and an 8 byte UDP header. It should be noted that in LIPE no field is provided in the header for error checking because the UDP checksum provides payload error detection. The UDP header includes UDP packet length information (not shown), which fixes the overall length of the encapsulated LIPE packets.

As noted above, LIPE allows multiplexing of application (or user) sessions. The following is an illustrative multiplexing procedure for use in a packet endpoint (such as in the above-described base station 1 of FIG. 2). It is presumed that the packet endpoint is suitably programmed to carry out the below-described method using conventional programming techniques, which, as such, will not be described herein.

In this example, it is assumed that base station 1 receives radio frames, extracts user data, and retransmits the user data to MSC 5 using LIPE. As noted above, the UID field value of an LIPE packet is used to identify a particular user, or application. In order to limit any multiplexing delay, it is assumed that base station 1 uses a multiplexing timer with a lifetime of T_mux, where T_mux illustratively equals 10 milli-seconds (ms).

Figure 8:
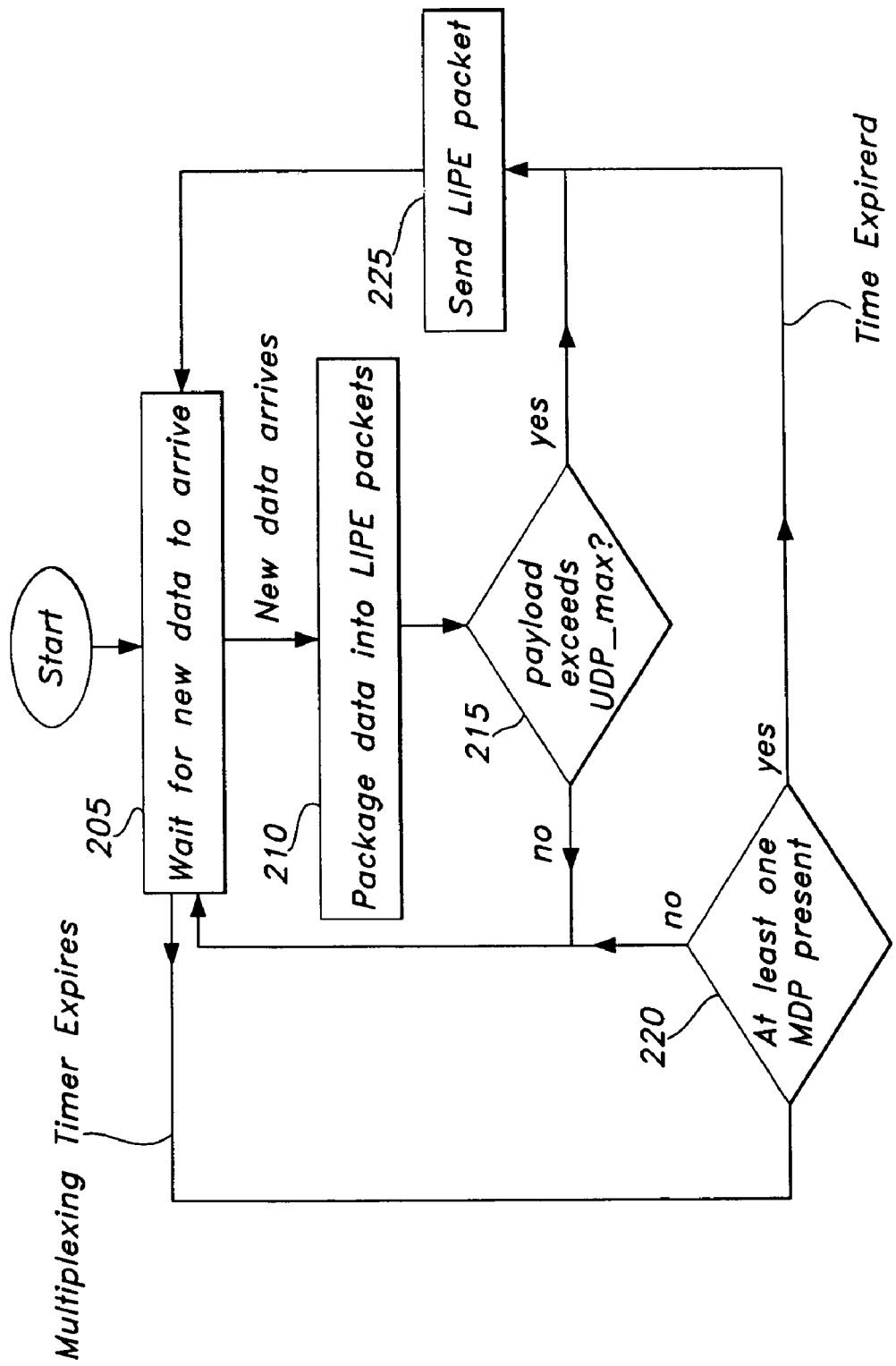
FIG. 8 is a flow chart of an illustrative multiplexing procedure.

The multiplexing procedure is shown in FIG. 8. In step 205, base station 1 waits for data from users to arrive. When data generated by an application arrives, base station 1 proceeds to step 210. During this step, base station 1 processes the incoming data from an application into one respective LIPE packet (or multiple LIPE packets if the data exceeds 2048 bytes), each of which comprises an MH and an MDP. As noted, incoming data from a particular application can be spread across multiple LIPE packets using the above-mentioned M bit. A counter n is also incremented to count the total number of MDPs collected for this UDP packet.

Given a maximum IP packet length (in bytes) of L_max, a UDP/IP packet can carry a maximum payload (in bytes) of up to L_max–H_ip–H_udp, where H_ip is the IP header length (20 bytes without options) and H_udp is the UDP header length (8 bytes). However, in terms of LIPE packets, this maximum payload size is further reduced by nH_mh, where H_mh is the MH length and n is the number of MDPs used, as mentioned above. Therefore, and as used herein, maximum UDP payload size, UDP_max is:

UDP_max=L_max–H_ip–H_udp–nH_mh.

Note that L_max is specified by the application and in principle can be up to 65535 bytes. But in practice it is usually not sensible to make it too large. For example, if the underlying transmission medium is known to have a maximum transmission unit (MTU) of 1500 bytes, then it would be appropriate to set L_max to be no more than 1500 bytes. Another consideration when choosing L_max is the trade-off between multiplexing delay and multiplexing efficiency. Although the multiplexing delay is limited by the lifetime of the multiplexing timer, a small L_max still reduces the average multiplexing delay (at the expense of possibly reducing the multiplexing gain).

In step 215, base station 1 checks the total size of the accumulated LIPE packets. If the accumulated payload (total size of the MDPs) is smaller than UDP_max, base station 1 goes back to step 205. Otherwise base station 1 goes to step 225 under three different conditions:

1) If the latest received payload size is larger than L_max–H_ip–H_udp–H_mh, then this new payload, after being encapsulated into a UDP packet, won't even fit into a single IP packet. In this case, the previously accumulated LIPE packets are sent in one single UDP packet in step 225. Additionally, the latest received payload is encapsulated in one UDP packet (whose size can be as big as 65535–H_ip–H_udp=65508 bytes) and immediately sent in step 225. Base station 1 then goes back to step 205, restarts the multiplexing timer, and sets n to zero.

2) If the total payload (including the latest received one) equals UDP_max, then all the LIPE packets (including the new ones) are sent in a single UDP packet in step 225. Base station 1 then goes back to step 205, restarts the multiplexing timer, and sets n to zero.

3) If the total payload (including the latest received one) exceeds UDP_max, then all the previously accumulated LIPE packets are sent in a single UDP packet in step 225. The LIPE packets formed from the latest received payload are retained for the next UDP packet. Base station 1 then goes back to step 205, restarts the multiplexing timer, and sets n to the number of LIPE packets.

If, while in step 205, the multiplexing timer expires, base station 1 checks if it has gathered any MDPs at step 220. If there are no MDPs, it simply restarts the multiplexing timer. If there is at least one MDP, it transmits the accumulated MDPs in one UDP packet in step 225, restarts the multiplexing timer, sets n to zero, and begins the process anew in step 205. Note that in this case, the transmission occurs regardless of the size of the UDP packet.

As described above, LIPE offers a different approach to multiplexing application sessions using RTP and provides a number of advantageous features, as described below.

LIPE is simpler, i.e., lightweight, compared with the other earlier-mentioned multiplexing proposals based on RTP.

LIPE should be more suitable to the modern/future IP architectures compared with RTP-based approaches since these modern/future IP architectures should offer various levels of resource guarantees (e.g. see V. P. Kumar, T. V. Lakshman, D. Stiliadis, "Beyond Best Effort: Router Architectures for the Differentiated Services of Tomorrow's Internet," IEEE Communications Magazine, May 1998 Vol 36, No 5, pp 152–164).

LIPE imposes no limit on packet size other than the size limit of a UDP packet. This makes LIPE suitable to carry both small voice packets and large data packets. LIPE achieves this by using the M field in the multiplexing header and transporting large data packets in a single UDP packet.

The 16-bit UID field in the MH of LIPE makes it easy to use in other applications such as third generation wireless systems where handoffs may occur during the lifetime of a session. For example, a service provider can transparently subdivide the 16 bit UID field into a user identifier field (e.g. 11 bits) and a base station identifier field (e.g. 5 bits). Also, by having a larger user space, the signaling overhead due to identifier re-negotiation during a handoff can be greatly reduced. Further, when there are a large number of bursty traffic sources (such as data users doing web browsing), the large user space of LIPE also prevents reduction in multiplexing gain.

The sequence number field in the MH of LIPE provides certain capability for coping with loss, out-of-sequence delivery, and delay jitters.

The optional PT/CoS field in the MH of LIPE allows applications to specify the payload type (e.g. codec type) and the desired QoS after demultiplexing from LIPE. The payload type specification is necessary when there are heterogeneous voice source types, while the CoS field gives the application the flexibility to choose different type of services, such as low loss or low delay, after the LIPE demultiplexing point.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., an LIPE formatter, etc., the functions of any one or more of those building blocks can be carried out using one or more appropriately programmed processors, e.g., a digital signal processor; discrete circuit elements; integrated circuits; etc. Further, although illustrated in the context of CDMA, the inventive concept is applicable to any wireless system (e.g., UMTS, etc.) or application that requires real-time multiplexing of data streams.

What is claimed is:

1. A method for use in a packet server, the method comprising the steps of:
   receiving a number of incoming data packets;
   formatting a multiplexing header for each incoming data packet, wherein the formatted multiplexing header includes a user identifier field, a length indicator field, a more packets field, a class of service field, and a sequence number field; and
   multiplexing the formatted multiplexing headers and their associated incoming data packets into a single transport session.

2. The method of claim 1 wherein the formatting step encapsulates LIPE packets using Internet Protocol/User Datagram Protocol (IP/UDP) transport.

3. The method of claim 2 wherein the format for an encapsulated LIPE packet using (IP/UDP) transport comprises an IP header field, a UDP header field and at least one multiplexing header and an associated multimedia data packet, wherein the multiplexing header comprises a user identifier field, a length identifier field, and a more packets field, the more field being used to indicate the use of more than one multiplexing header and associated multimedia data packet for transporting incoming data packets.

4. The method of claim 1 wherein the more packets field is used to indicate the use of more than one multiplexing header and an associated data packet for transporting incoming data packets.

5. The method of claim 1 wherein the class of service field further comprises a number of bits representative of a payload type and a remaining number of bits representative of a quality of service.

6. The method of claim 5 wherein the number of bits representative of the payload type represent different voice coding schemes.

7. The method of claim 1, wherein, the number of incoming data packets is from a plurality of users.

8. A method for use in a packet server, the method comprising the steps of:
   receiving a number of incoming data streams from a plurality of users;
   formatting the incoming data packets into user datagram (UDP)/Internet Protocol (IP) packets such that each UDP/IP packet encapsulates at least a UDP header, an IP header and a formatted multiplexing header, wherein the formatted multiplexing header portion includes information for identifying an application associated with the payload, a user identifier field, a length indicator field, a more packets field, and a class of service field, where the more packets field is used to indicate the association of more than one data packet for the application.

9. The method of claim 8 wherein the class of service field further comprises a number of bits representative of a payload type and a remaining number of bits representative of a quality of service.

10. The method of claim 9 wherein the number of bits representative of the payload type represent different voice coding schemes.

11. A method for use in a packet server, the method comprising the steps of:
    receiving a number of incoming LIPE packets associated with at least one of different applications and a plurality of users; and
    formatting each of the incoming LIPE packets into user datagram (UDP)/Internet Protocol (IP) packets such that each UDP/IP packet encapsulates at least a UDP header, an IP header, a formatted multiplexing header and a payload portion, wherein the formatted multiplexing header portion includes information for identifying the different applications, a user identifier field, a length indicator field, a more packets field, and a class of service field, where the more packets field is used to indicate the association of more than one data packet for an application.

12. The method of claim 11 wherein the class of service field further comprises a number of bits representative of a payload type and a remaining number of bits representative of a quality of service.

13. The method of claim 12 wherein the number of bits representative of the payload type represent different voice coding schemes.

14. An improved apparatus for transporting packets, the improved apparatus comprising:
    a reception unit adapted to receive a number of incoming data packets;
    an analysis unit adapted to analyze multiplexing header information associated with each incoming data packet;
    a formatting unit adapted to format a multiplexing header for each incoming data packet utilizing the analyzed multiplexing header information;
    wherein the formatted multiplexing header includes a user identifier field, and length indicator field, a more packets field, a class of service field and a sequence number field, wherein the more packets field is used to indicate the use of more than one multiplexing header and associated data packet for transporting incoming data packets; and
    a modulator unit adapted to multiplex the incoming data packets into a single transport session.

15. The improved apparatus of claim 14 wherein the formatting unit further encapsulates the incoming data packets using User Datagram Protocol/Internet Protocol (UDP/IP) transport.

16. The improved apparatus of claim 15 wherein the format for an encapsulated LIPE packet using (IP/UDP) transport comprises an IP header field, a UDP header field and at least one multiplexing header and an associated multimedia data packet, wherein the multiplexing header comprises the user identifier field, length indicator field, and more packets field.

17. The improved apparatus of claim 14 wherein the class of service field further comprises a number of bits representative of a payload type and a remaining number of bits representative of a quality of service.

18. The improved apparatus of claim 17 wherein the number of bits representative of the payload type represent different voice coding schemes.

19. The method of claim 14 wherein the number of incoming data packets is from a plurality of users.

* * * * *